H. A. MYERS.
SPEED CONTROL MECHANISM.
APPLICATION FILED SEPT. 27, 1913.
1,148,527.
Patented Aug. 3, 1915.
3 SHEETS—SHEET 3.
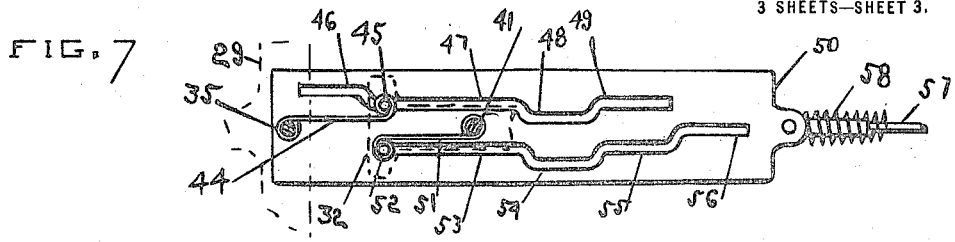
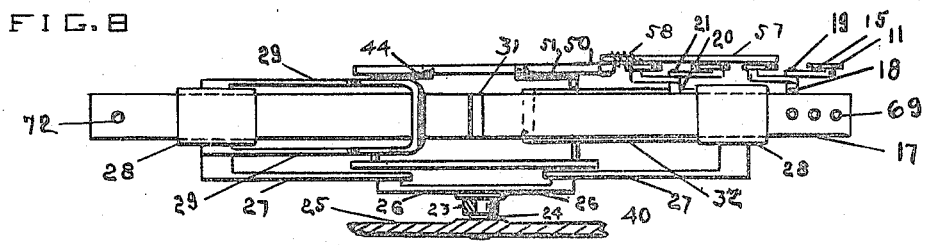
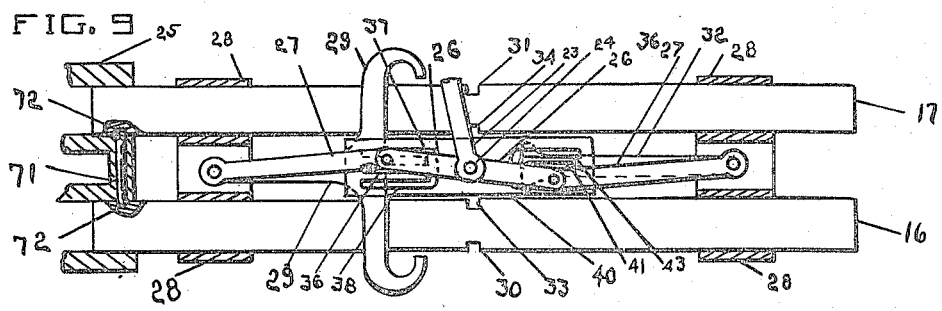
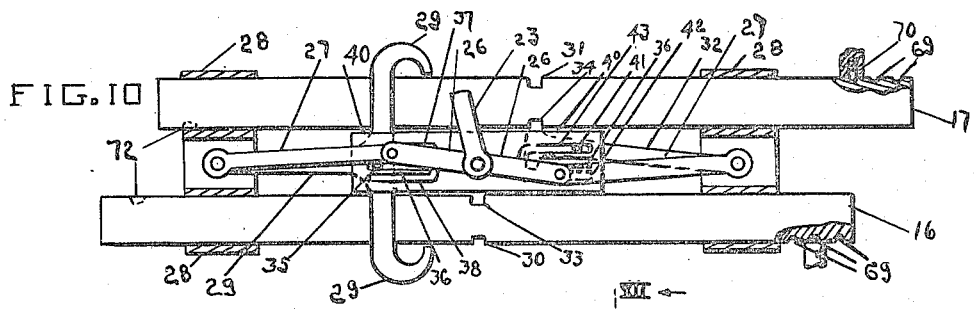
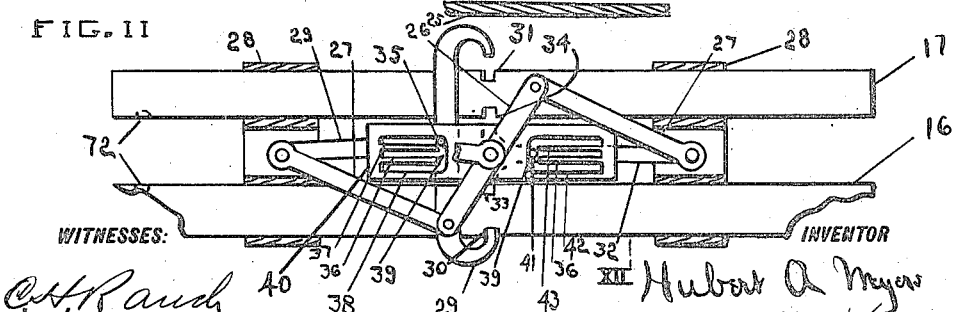

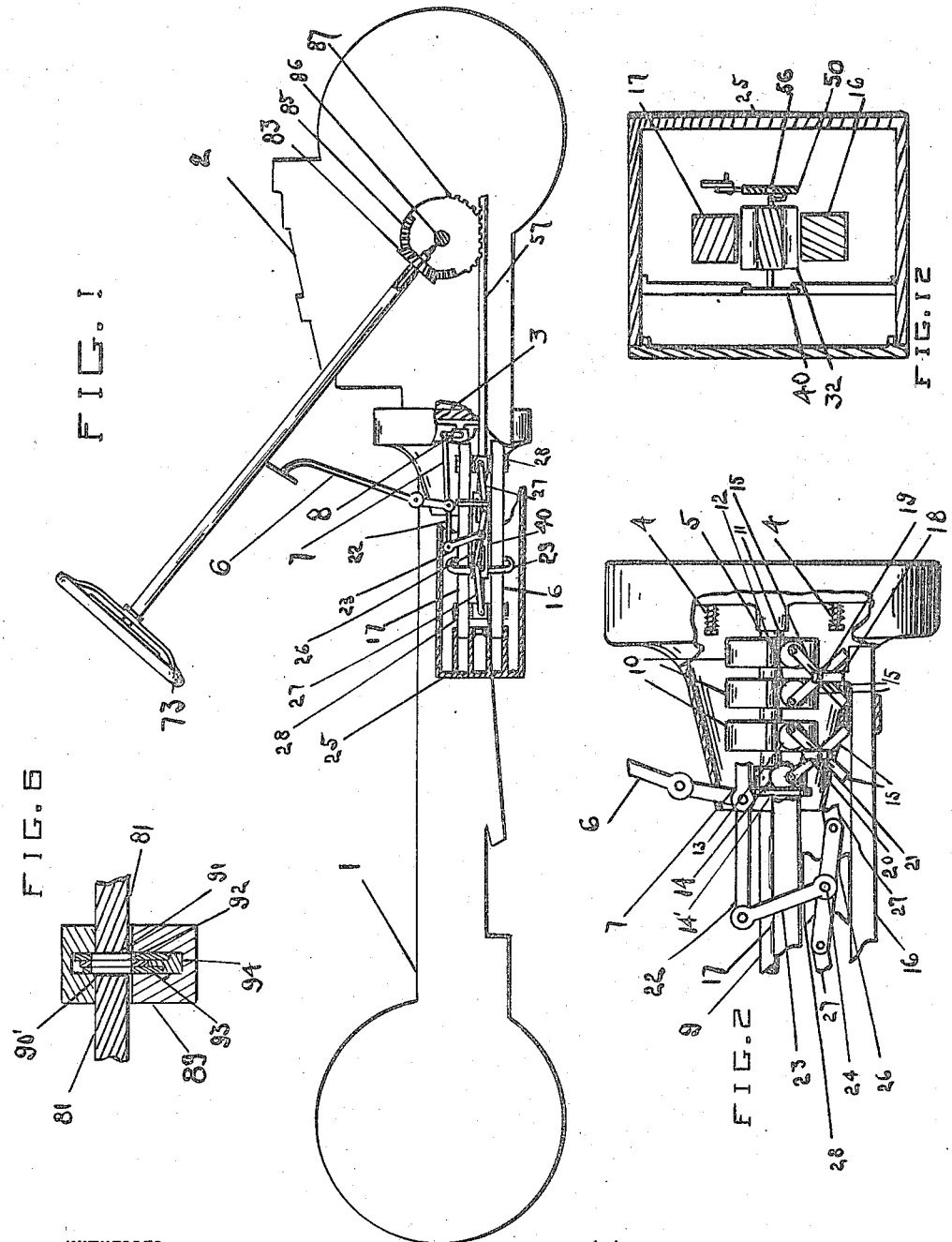

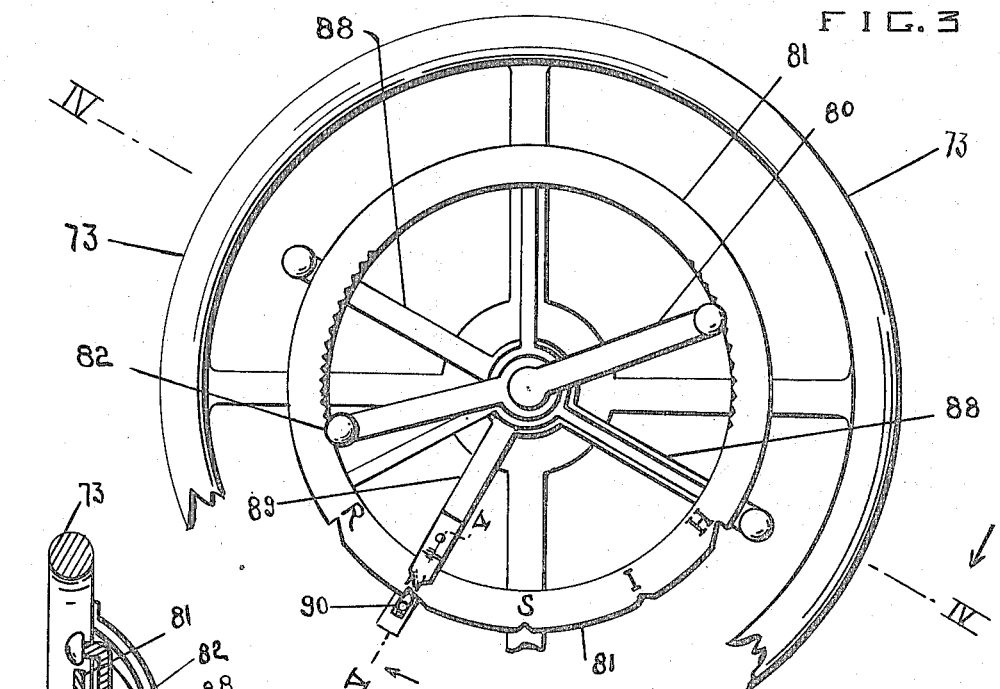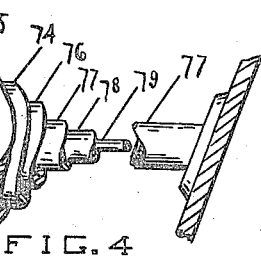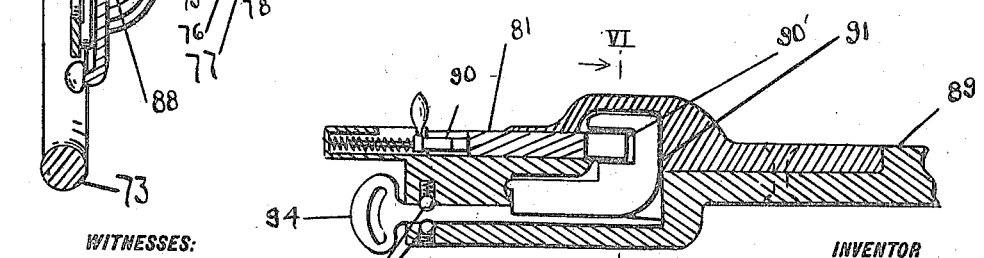

UNITED STATES PATENT OFFICE.

HUBERT A. MYERS, OF TOLEDO, OHIO, ASSIGNOR OF ONE-HALF TO ALBERT A. ATWOOD, OF TOLEDO, OHIO.

SPEED-CONTROL MECHANISM.

1,148,527.   Specification of Letters Patent.   Patented Aug. 3, 1915.

Application filed September 27, 1913. Serial No. 792,109.

*To all whom it may concern:*

Be it known that I, HUBERT A. MYERS, a citizen of the United States of America, residing at Toledo, Lucas county, Ohio, have invented a new and useful Speed-Control Mechanism, of which the following is a specification.

This invention relates to mechanism for simplifying and safe guarding the control of machines.

This invention has utility when embodied in the steering control selection and driving of machines, being specially adaptable to motor vehicles.

Referring to the drawings: Figure 1 is a fragmentary side elevation of an embodiment of the invention in a motor vehicle; Fig. 2 is a fragmentary side elevation on an enlarged scale of the vehicle driving means and the control mechanism connected thereto; Fig. 3 is a plan view of the steering wheel and associated control members, with a portion broken away; Fig. 4 is a section on the line IV—IV, Fig. 3, looking in the direction of the arrow; Fig. 5 is a section on an enlarged scale, on the line V—V, Fig. 3; Fig. 6 is a section on the line VI—VI, Fig. 5, looking in the direction of the arrow; Fig. 7 is a detail of the slidable cam selector; Fig. 8 is a plan view of the cam selector of Fig. 7 and the actuators directed thereby; Fig. 9 is a side elevation of the mechanism of Fig. 8, the parts being shown in disconnected position; Fig. 10 shows the mechanism of Fig. 8, but with the shift to high speed forward; Fig. 11 is a view of the mechanism of Fig. 8 with the parts drawn into central disconnected position; and Fig. 12 is a section on the line XII—XII Fig. 11.

The motor vehicle 1 is provided with the prime mover 2 driving the clutch 3 normally held in driving relation by the springs 4 for actuating the shaft 5. Disconnection is effected by forward movement of the clutch foot lever 6 connected through the link 7 to the lever 8. Upon release of the clutch lever or manually operable member 6, the springs 4 cause it to return to initial position.

The mechanism for establishing a plurality of driving relations between the shaft 5 and the driven shaft 9 involves a variable speed drive, for instance a planetary transmission controlled by band brakes or clutches 10 of the strap type. To tighten or set these holding straps 10 mechanism is provided including the eccentrically mounted cams 11, 12, 13, respectively for reverse, low speed forward and intermediate or high speed forward, the additional eccentric cam 14 throwing the clutch member 14' for high speed driving of the shaft 9. Each of these eccentric cams has a slotted arm 15 rigid therewith.

To effect the gear shifting herein for establishing the changes in driving relation, shift members or bars 16, 17 are provided. The member 16 carries the arm 18, having a pin 19 riding in the slots of the eccentric arms 15 for the cams 11, 12, so that in the shifting of the member 16 away from the clutch 3, or rearwardly, the cam 11 effects connection for reverse driving, while the opposite or forward shifting of the member 16 causes the cam 12 to connect up for slow speed forward. The shift member 17 carries the arm 20 having a pin 21 riding in the slots of the cam arms 15 for the cams 13, 14. Rearward shifting of the member 17 will cause the cam 13 to tighten the strap 10 for intermediate or second speed forward, while forward shifting of the member 17 will cause the cam 14 to connect the clutch 14' for high speed forward.

Extending rearwardly from the lower arm of the clutch lever 6 is the link 22 effective to rock the arm 23 mounted on the shaft 24 protruding from the mechanism housing 25. Besides the arm 23, the shaft 24 has rigid therewith the cross arm 26 connected by the links 27, one from each end thereof to the slides 28 embracing the members 16, 17, and freely movable thereon. One slide 28 carries the outer dog 29 movable to engage notch 30 in the member 16 and notch 31 in the member 17. The other slide 28 carries the inner dog 32 movable to engage the notch 33 in the bar 16 and notch 34 in the bar 17. The dog 29 carries rigid therewith the pin 35 coacting with the ways 36, 37, 38, meeting at the junction 39. These ways are in the plate 40 carried by the housing 25, and serve as a retaining means for retaining the dog when shifted in the selected shift position. The intermediate way 36 holds the dog in disconnecting position. The way 37 above holds the lower tooth of the dog 29 in the notch 30 of the bar 16 in effecting rearward shifting of this member 16, connecting the cam 11 for reverse travel of the vehicle 1. The way 38 below serves through the pin 35 to hold the dog 29 in the notch 31 for rearward shifting of the upper bar 17, the connection being then through the cam 13 for intermediate or second speed forward. The dog 32 carries rigid therewith the pin 41 which in its travel from the junction 39 in the way 36 of the plate 40, holds the dog 32 in disconnecting position. The lower way 42, parallel to the way 36 and extending from the junction 39, as does the way 38, serves to hold the dog 32 in the notch 33 in the bar 16 for forward shifting thereof which effects connection through the cam 12 for slow speed forward driving of the vehicle 1. The way 43 serves through the pin 41 to hold the dog 32 for shifting engagement with the notch 34 in the bar 17, for high speed forward driving through the setting of the cam 14 to connect up the clutch 14'. The pin 35 extends through the dog 29 to carry on its opposite end the spring arm 44 (Fig. 7) having at its free terminus the pin 45 slidable in the way 46, 47, 48, 49, of the reciprocable slide plate or selector member 50. The pin 41 extends through the dog 32 and carries on its opposite end the yieldable or spring arm 51 having at its free terminus the pin 52 slidable in the way 53, 54, 55, 56, of the slide member 50. The actuating bar 57 for the selector slide 50, is yieldably connected thereto by the spring 58 so that selection may occur, even though there may be resistance to slide 50 changing position to fully respond to the selection at once.

Each of the shift bars 16, 17, is provided with notches 69 into which may yieldably engage the spring plungers 70, coacting to hold the bars in the various positions of engagement or disengagement. The central notches 69 are the ones in which the plungers 70 seat to yieldably hold the bars 16, 17, in disconnected positions. To preclude shifting of one bar when the other bar is thrown or away from neutral or disconnecting position, the plunger 71 is provided to slide in the housing 25 and engage either notch 72 of the bars 16, 17. This plunger 71 is of such length that when it is in the recess 72 of one bar, it leaves the other bar free for shifting to a selected position. The bar selected for shifting from neutral or disconnected central position, accordingly forces the plunger 71 into the notch 72 of the other bar, thereby locking the other bar in neutral until the shifted bar returns to the disconnecting neutral position.

While the speed changes are directly caused by the lever 6 moving the actuators or dogs 29, 32, the general control and selection may be effected from the steering wheel 73. The steering wheel 73 is mounted on the steering post 74 within the casing or housing 75. Within the steering post 74 is the tubular control stem 76 having next inside thereof the fixed indicator supporting sleeve 77. Inside the sleeve 77 is another tubular control stem 78 surrounding the central control rod 79. The control rod 79 may carry the actuating arm 80 shiftable along the indicator ring 81 carried by the sleeve 77. In internal combustion motor propelled vehicles, this stem or rod 79 may control the fuel or gas while the stem 78 may in its shiftings through the arm 82 along the indicator ring 81 control the spark. The further control member or stem 76, in this instance, is shown as a selector, having the bevel gear 83 in mesh with the segment 85 on the shaft 86 having the teeth 87 to reciprocate the rack bar 57 connected to the selector slide plate 50 by the spring 58. The stem 76 is multiple armed, having the pair of relatively rigid diametrically disposed arms 88, which in normal use of the steering wheel 73 leaves an arm 88 adjacent either hand of the driver, so that selection control may be most conveniently accomplished with either hand of the driver. There may be the additional intermediate indicating arm 89, having the advantage of placing the indications directly in front of the driver, even with the advantage of side arms for ready shifting. The indicator ring 81 carries indicating notches for readily definitely determining exact shift positions selected, the high (H) and reverse (R) serving as limit stops as engaged by the automatic catch 90. There is also a stop at neutral (N), the notch (Fig. 3) being so configured that shifting by either arm 88 from a forward speed to attempt reversing cannot be accomplished without the extra manipulation of removing the plunger 90 by forcing it against its spring to thus get it back of its taper portion and avoid the straight stop side thereof. This safeguard in driving for protecting the machinery insures calling for the second thought of the driver when it becomes necessary to release this automatic catch. Forward shiftings of the indicator arm 89 by the selector arms 88 may be uninterrupted by the catch 90 within the range of movement. With the gearing in neutral or disconnected position, the selector may be shifted to S or first speed forward, and thrusting forward of pedal 6 will bring the devices, even from any connected position, to neutral, and selection is effective so that in the recover travel of the pedal through the action of the springs 4, actual shifting or connection occurs. For second speed forward, selection I, followed by the pedal operation effects connection for second or intermediate speed forward. For third speed forward or high, selection H with the operation of the pedal 6 connects for high speed forward. Disposal of the selector arms 88, followed by pedal operation brings about speed changes.

A safeguard in motor car usage, especially against undesirable operation by others, and to avoid theft, is in the provision at neutral (N) of an automatic lock. The indicator ring 81 has the notch 90' into which may fall the locking elements 91, 92, 93. This plurality of locking elements may normally be held by the slide key 94 free of the notch 91, so the selector may be shifted to any desired position. The spring plungers 95 retain this slide member 94 in notch freeing position. Upon removal of the key 94, the elements 91, 92, 93, are free for independent movement, and variously fall against the ring 81, and upon reaching the notch 91 effectively lock the selector into drive disconnecting position—neutral (N), precluding movement of the motor car under its own power without unlocking this control arm feature.

The operation of an internal combustion motor propelled vehicle with the control herein adapted thereto is most simple and responsive for reliable handling. With the steering wheel are incorporated the gas, spark and gear shifting or speed changing features. Without diversion of attention from the steering wheel and without even releasing the steering wheel from control of the driver, features of control, as the gas and spark may be adjusted. But further, even as conveniently, if not more so, speed selection may be made, and with either hand, through the arms 88. There is the reminder check not to attempt to run the car backward when propelled ahead, in the automatic catch 81, requiring a new position for one hand of the driver, and incidentally causing him to think twice before getting into reverse selection, thereby suggesting that caution in care of the machine is obtained in not attempting to run backward when forward headway is had. With the slip key 94 removed, there is the safeguard against theft, in that a speed selection to or past neutral will securely lock the driving mechanism in disconnected position, should the machine not have been so left. The arm 88 is moved to bring the arm 89 to the next speed desired, say from neutral to high speed forward, as indicated at "H" Fig. 3. The travel of the arm 89 takes with it the stem 76 carrying the pinion 83 in mesh with the segment 85 on the shaft 86, effective through the toothed portion 87 to drive the rack bar 57. This actuating bar 57 is connected by the spring 58 to the selector guide plate 50, and this spring tends by either compression or extension to maintain the plate 50 in the normal position as to the bar 57. In the plate 50, the way 46 holds the pin 45 to yieldably actuate the dog 29 into engagement with the bar 16 for actuation rearwardly and thereby connect the transmission gearing for backing the vehicle, or reverse driving. With the pin 45 in the way 46, the pin 52 is in the way 53, and holds the dog 32 free from each bar 16, 17. In the instance herein taken, the pins 45, 52, are considered as in the neutral ways 47, 53, so that each dog 29, 32, is held away from engagement with the bars 16, 17. The shifting to effect the actual speed change is most easily accomplished. Forward thrust of the pedal lever 6, first disconnects the clutch 3 from driving relation, and with the prime mover thus disconnected, continued travel of the lever 6 moves the cross arm 26 past toggle or dead point and begins effective work in drawing the actuators 29, 32 to central disconnecting position ready for the recover action or return of the lever 6 to bring about the actual throw of the bars 16, 17 desired making the speed change. After the dogs 29, 32 have had their travel, and the selected change connected up, the continued return of the lever 6 connects the clutch 3 for driving at the changed speed. The three positions for each bar 16, 17, are definitely and yieldably determined by the yieldable plungers 70 engaging the recesses 69. While simultaneous shifting of these bars is precluded by the plunger 71 engaging the unshifted recess 72 until the other recess in the shift bars 16, 17, alines to permit change. The spring 58 permits the selection in advance of the speed desired.

What is claimed and it is desired to secure by Letters Patent is:

1. A motor vehicle control mechanism embodying a steering wheel, driving means for the vehicle, means for establishing a plurality of driving relations for the driving means, a foot lever for changing the driving relations, a selector for the driving relations to be changed by the foot lever, said selector embodying multiple arms mounted on the steering wheel, a lock for one of said arms at disconnecting position of the selector, and an insertible slide key rendering said lock inoperative.

2. Mechanism for establishing a plurality of driving relations, a selector for the driving relations of the mechanism embodying a reciprocable cam plate, an actuator directed by the cam plate, and shifting means engaged by the actuator to effect different driving relations of the mechanism.

3. Mechanism for establishing a plurality of driving relations, a selector for the driving relations of the mechanism embodying a slidable cam member, an actuator directed by the member, driving means for the actuator, and shifting means engaged by the actuator to effect different driving relations of the mechanism.

4. Mechanism for establishing a plurality of driving relations, a selector for the driving relations of the mechanism embodying a slidable member, a pair of actuators directed by the member, and shifting means engageable by the actuators to effect different driving relations of the mechanism.

5. Mechanism for establishing a plurality of driving relations, shifting means for the mechanism, an actuator for the shifting means, said actuator provided with a relatively yieldable arm, and a control selection directing member coacting with said arm.

6. Mechanism for establishing a plurality of driving relations, shifting means for the mechanism, an actuator for the shifting means, said actuator provided with a relatively yieldable arm, and a control selector embodying a slidable cam member coacting with said arm.

7. Mechanism for establishing a plurality of driving relations, shifting means for the mechanism, an actuator for the shifting means having disconnecting and control positions, a slidable member movable independently of the position of the actuator for directing control selection of the actuator to disconnecting position or to different control positions, and retaining means adjacent the member holding the actuator in selected control position directed by the member when shifted from disconnecting position.

8. Mechanism for establishing a plurality of driving relations, shifting means for the mechanism, an actuator for the means, a selector embodying a slidable member, and selector operating means yieldably coacting with the member to position the actuator.

9. Mechanism for establishing a plurality of driving relations, shifting means for the different driving relations of said mechanism, an actuator for the shifting means, a selector for the different driving relations of the actuator operable independently of the position of the actuator, and an automatic lock out device for all other driving relation positions of the shifting means.

10. Mechanism for establishing a plurality of driving relations, shifting means for selecting a determined driving relation for said mechanism when another driving relation of the mechanism is connected, a lockout device for all other driving relations of the mechanism, and means for returning the shifting means to disconnecting position and thereby releasing the shifting means from the lockout device.

In witness whereof I affix my signature in the presence of two witnesses.

HUBERT A. MYERS.

Witnesses:
   GEO. E. KIRK,
   C. H. RAUCH.